(12) United States Patent
Ballweg

(10) Patent No.: US 7,427,934 B2
(45) Date of Patent: Sep. 23, 2008

(54) METHOD AND CIRCUIT FOR RECOVERING A CLOCK

(75) Inventor: Christof Ballweg, Villingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 11/578,458

(22) PCT Filed: Apr. 2, 2005

(86) PCT No.: PCT/EP2005/003477

§ 371 (c)(1),
(2), (4) Date: Oct. 16, 2006

(87) PCT Pub. No.: WO2005/101403

PCT Pub. Date: Oct. 27, 2005

(65) Prior Publication Data

US 2007/0210944 A1    Sep. 13, 2007

(30) Foreign Application Priority Data

Apr. 16, 2004 (DE) .................. 10 2004 019 045

(51) Int. Cl.
*H03M 7/00* (2006.01)
(52) U.S. Cl. ..................... 341/50; 369/53.34
(58) Field of Classification Search ............ 341/50, 341/51; 370/516; 369/53.34
See application file for complete search history.

(56) References Cited

U.S. PATENT DOCUMENTS 4,495,474 A    1/1985  Meisei et al.

6,954,413 B2 * 10/2005 Graffouliere ............. 369/53.34
2001/0055355 A1  12/2001 Okamoto
2005/0281292 A1 * 12/2005 Troulis et al. ............... 370/516

FOREIGN PATENT DOCUMENTS

DE    195 46 632 A1    6/1997
EP    0763824    3/1997

OTHER PUBLICATIONS

Seok Jun Ko et al: "A Robust Digital Timing Recovery With Asymmetry Compensator for High Speed Optical Drive Systems" IEEE Transations on Consumer Electronics, IEEE Inc. New York US, vol. 47, No. 4, Nov. 2001, pp. 821-830.
Search Report Dated Jun. 1, 2005.

* cited by examiner

*Primary Examiner*—Rexford Barnie
*Assistant Examiner*—Joseph Lauture
(74) *Attorney, Agent, or Firm*—Joseph J. Laks; Robert D. Shedd; Reitseng Lin

(57) ABSTRACT

The present invention relates to a method for recovering a clock from a run-length-coded data stream, said method making it possible for a phase-locked loop to lock in a rapid manner, and also to a circuit for implementing the method. An inventive method for recovering a clock from a run-length-coded data stream comprises the steps of: ascertaining the distribution of symbol lengths in the data stream for a chosen clock period; determining the deviation of the maxima of the distribution of symbol lengths from integer multiples of the chosen clock period; and regulating the chosen clock period on the basis of the deviation determined.

8 Claims, 2 Drawing Sheets

METHOD AND CIRCUIT FOR RECOVERING A CLOCK

This application claims the benefit, under 35 U.S.C. § 365 of International Application PCT/EP05/003477, filed Apr. 2, 2005, which was published in accordance with PCT Article 21(2) on Oct. 27, 2005 in English and which claims the benefit of German patent application No. 102004019045.3, filed Apr. 16, 2004.

FIELD OF THE INVENTION

The present invention relates to a method and a circuit for recovering a clock from a run-length-coded data stream and also to a device for reading from and/or writing to storage media, or for receiving data streams, which uses such a method or such a circuit.

BACKGROUND OF THE INVENTION

In order to decode data streams which use RLL coding, that is to say run-length-limited coding, it is necessary to recover the 1/T frequency from the data stream, where T is the period of one channel bit. Such data streams occur, inter alia, when playing back data stored on storage media. Examples of such storage media are hard disks or optical storage media (CD: Compact Disc; DVD: Digital Versatile Disc, etc.). In addition, data streams of this type also occur in wired and wireless data transmission.

In accordance with the prior art, the 1/T clock is recovered by checking the longest and shortest symbol lengths permitted in the data stream and also infringements of the run-length limitation. This approach has the disadvantage that only the symbols at the upper and lower limits of RLL coding are used to recover the 1/T clock. This results in a longer locking time of a phase-locked loop (PLL) which is used to recover the 1/T clock.

SUMMARY OF THE INVENTION

Therefore, it is an object of the invention to propose a method for recovering a clock from a run-length-coded data stream, which method avoids the abovementioned disadvantage and makes it possible for a phase-locked loop to lock in a more rapid manner. A further object of the invention is to propose a circuit for implementing the method.

This object is achieved, according to the invention, by means of a method for recovering a clock from a run-length-coded data stream, comprising the following steps:
ascertaining the distribution of symbol lengths in the data stream for a chosen clock period;
determining the deviation of the maxima of the distribution of symbol lengths from integer multiples of the chosen clock period; and
regulating the chosen clock period on the basis of the deviation determined.

The inventive method has the advantage that, in order to recover the clock, use is made not only of the symbol lengths at the upper and lower limits of RLL coding, but also of the symbol lengths in between said limits. This considerably shortens the stabilization time of a system which is intended to recover stored data and which uses the method.

The distribution of symbol lengths is advantageously subjected to a modulo operation relative to the clock period. This allows the deviation of the maxima of the distribution of symbol lengths from integer multiples of the chosen clock period to be determined within a single bit cell, thus reducing the processing complexity.

Only some of the permitted symbol lengths are preferably evaluated in order to ascertain the distribution of symbol lengths. This expedites the method, since fewer computation or processing steps need to be carried out.

In accordance with a further aspect of the invention, the method is implemented using a circuit for recovering a clock from a run-length-coded data stream, said circuit comprising:
a unit for ascertaining the distribution of symbol lengths in the data stream for a chosen clock period;
a controller for determining the deviation of the maxima of the distribution of symbol lengths from integer multiples of the chosen clock period; and
a unit for regulating the chosen clock period on the basis of the deviation determined.

A modulo operator which subjects the distribution of symbol lengths to a modulo operation relative to the clock period is preferably provided in the circuit.

The unit for ascertaining the distribution of symbol lengths advantageously evaluates only some of the permitted symbol lengths.

An inventive method or an inventive circuit is preferably used in a device for reading from and/or writing to storage media, or for receiving a run-length-coded data stream, in order to recover a clock from the data stream.

BRIEF DESCRIPTION OF THE DRAWINGS

In order to improve understanding, the invention will be explained below with reference to FIGS. 1 to 4, in which.

DETAILED DESCRIPTION OF PREFERRED EMBODIMENTS

Figure 1:
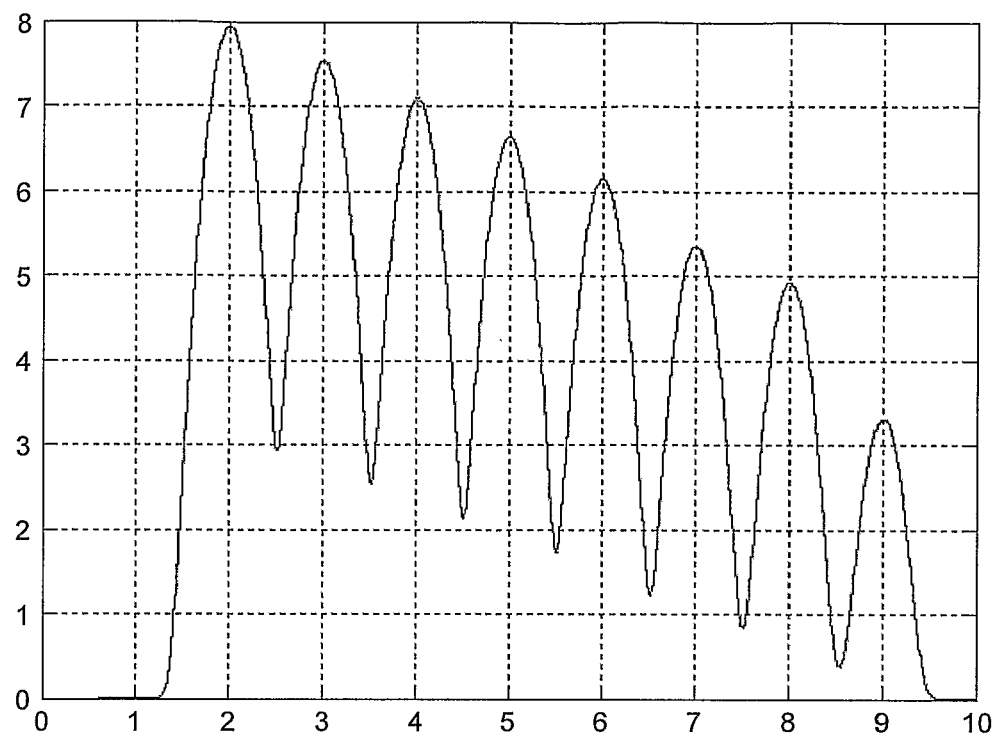
FIG. 1: shows a simulated histogram of RLL(1,7) coding for a 1/T clock rate.

FIG. 1 shows a simulated histogram of RLL(1,7) coding for a 1/T clock rate, that is to say the distribution of the symbol lengths which occur in the data stream when the correct 1/T clock rate is taken as the basis. As can be seen, the maxima of the distribution of symbol lengths are at integer multiples of the 1/T period. RLL(1,7) coding is used, inter alia, in optical storage media, for example in the BluRay disc (DVD: RLL (2,10)).

Figure 2:
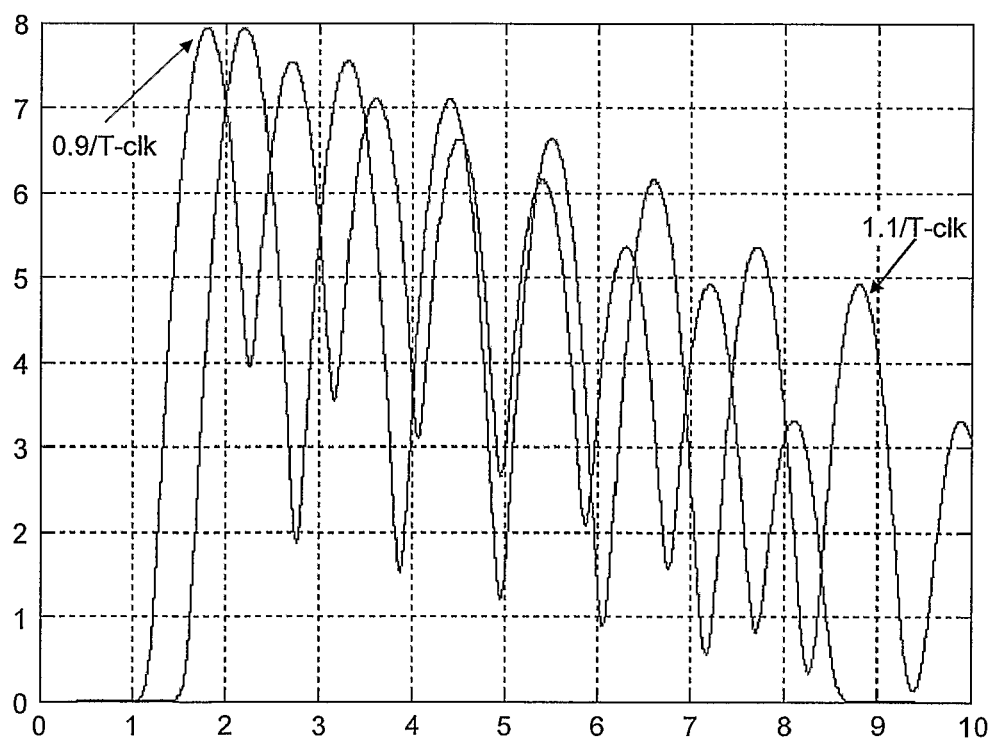
FIG. 2: shows simulated histograms of RLL(1,7) coding for a 1.1/T clock rate and a 0.9/T clock rate.

If an incorrect clock rate is taken as the basis, that is to say an excessively high or excessively low clock rate, the maxima of the distribution of symbol lengths are no longer at integer multiples of the 1/T period. This is shown in FIG. 2 using the example of a 1.1/T clock rate and a 0.9/T clock rate. The invention uses this effect in order to recover the 1/T clock correctly. In this case, the deviation of the maxima of the distribution of signal lengths from the expected distribution within one bit cell is preferably calculated. Mathematically, this corresponds to a modulo operation which is applied to the symbol lengths.

Figure 3:
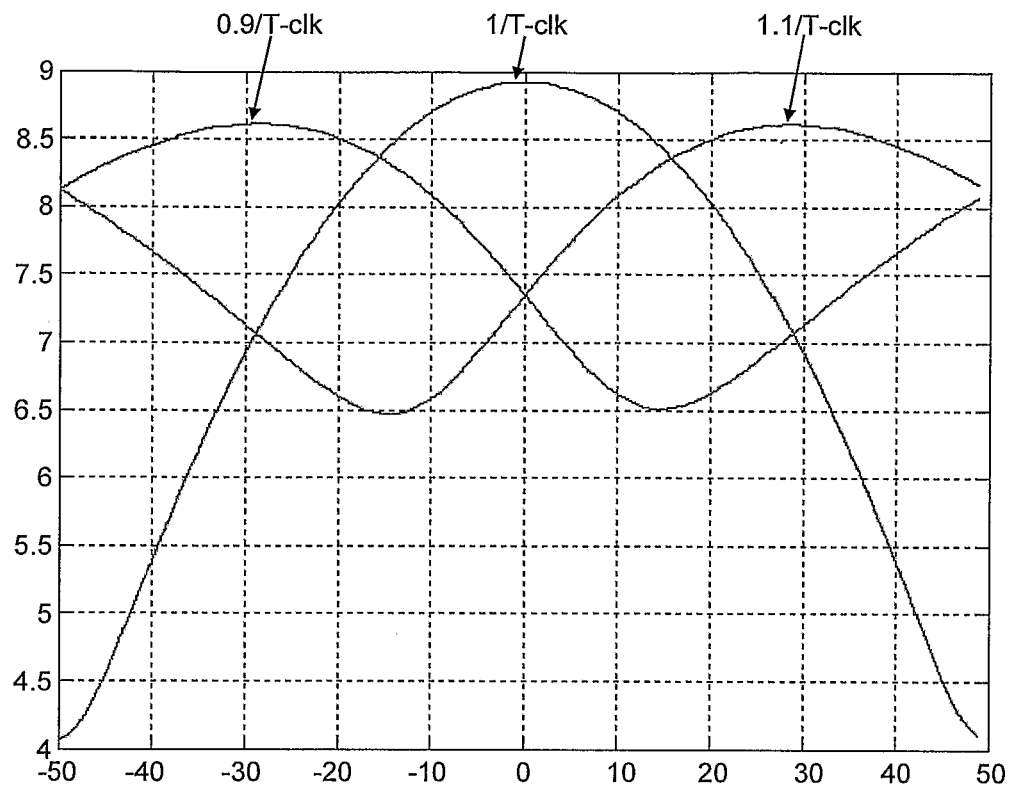
FIG. 3: shows a histogram of the symbol length within one bit cell.

FIG. 3 shows a calculation of this type within one bit cell using the example of the 0.9/T clock rate, the 1/T clock rate and the 1.1/T clock rate. The focal points, that is to say the maxima of the histograms for the 0.9/T clock rate and the 1/T clock rate, are no longer at "0", as expected for the correct 1/T clock rate. The deviation which occurs serves finally as an input value for a control unit for recovering the 1/T clock.

Figure 4:
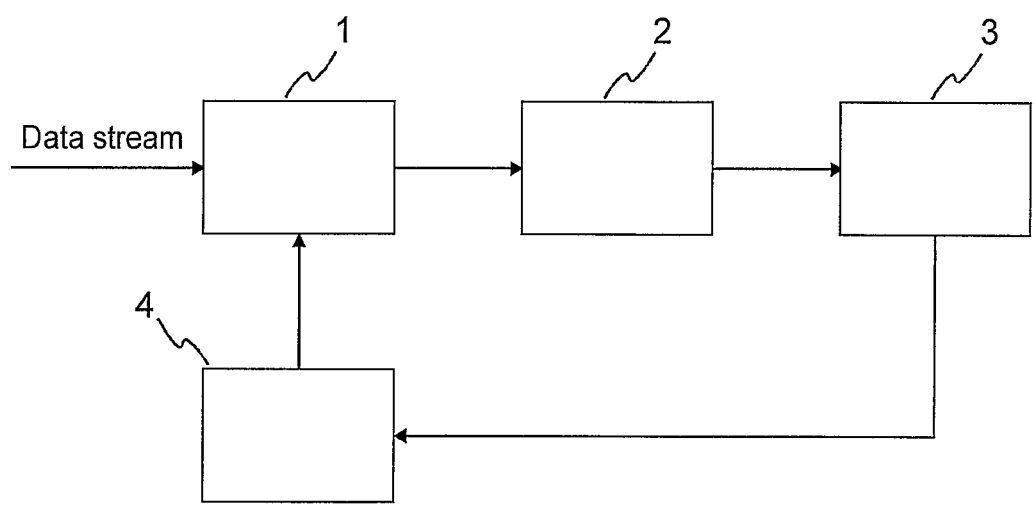
FIG. 4: shows the block diagram of a circuit for carrying out a method in accordance with the invention.

FIG. 4 illustrates the block diagram of a circuit for carrying out a method in accordance with the invention. The data stream which has been read from a storage medium (not shown) or has been received by means of data transmission is supplied to a unit 1 for counting the symbol lengths. The distribution of symbol lengths which is ascertained is transferred to a downstream modulo operator 2, which carries out the modulo operation described above. The result of the modulo operation is transferred to a controller 3, which determines the focal point of the histogram within the bit cell. The focal point ascertained then serves as the basis for setting the correct 1/T clock rate using a further unit 4, which determines the sampling times for the unit 1 for counting the symbol lengths.

The invention claimed is:

1. Method for recovering a clock from a run-length-coded data stream, said method comprising the steps of:
   ascertaining the distribution of symbol lengths in the data stream for a chosen clock period;
   determining the deviation of the maxima of the distribution of symbol lengths from integer multiples of the chosen clock period; and
   regulating the chosen clock period on the basis of the deviation determined.

2. Method according to claim 1, where the distribution of symbol lengths is subjected to a modulo operation relative to the clock period.

3. Method according to claim 1, where only some of the permitted symbol lengths are evaluated in order to ascertain the distribution of symbol lengths.

4. Device for reading from and/or writing to storage media, wherein it uses a method according to claim 1, in order to recover a clock from a run-length-coded data stream.

5. Device for receiving a run-length-coded data stream, wherein it uses a method according to claim 1, in order to recover a clock from the data stream.

6. Circuit for recovering a clock from a run-length-coded data stream, said circuit comprising:
   a unit for ascertaining the distribution of symbol lengths in the data stream for a chosen clock period;
   a controller for determining the deviation of the maxima of the distribution of symbol lengths from integer multiples of the chosen clock period; and
   a unit for regulating the chosen clock period on the basis of the deviation determined.

7. Circuit according to claim 6, wherein a modulo operator which subjects the distribution of symbol lengths to a modulo operation relative to the clock period is provided.

8. Circuit according to claim 6, where the unit for ascertaining the distribution of symbol lengths evaluates only some of the permitted symbol lengths.

* * * * *